Patented Nov. 19, 1940

2,222,331

UNITED STATES PATENT OFFICE 2,222,331

FLOTATION PROCESS

Arthur J. Weinig, Golden, Colo., assignor to Potash Company of America, Denver, Colo., a corporation of Colorado No Drawing. Application November 8, 1937, Serial No. 173,431

13 Claims. (Cl. 209—166)

This invention relates to a froth flotation process for the separation of the valuable constituents of sylvinite ores.

Sylvinite ore consists mainly of sodium chloride and potassium chloride crystals, together with minor inclusions of other mineral matter, such as iron and manganese oxides, clays, polyhalite and the like.

The invention relates particularly to the separation of the various salts of the ore to the end that potassium chloride may be recovered as a substantially pure product, and it is an object of the invention to provide a simple and inexpensive treatment by which various constituents other than potassium chloride solids are selectively floated in a froth, leaving the non-floated solids of the treatment as a purified potassium chloride product.

In a flotation treatment of the above-described character, the pulp-forming step involves the introduction of finely-divided particles of sylvinite ore into a saturated solution of the ore, and in this way dissolution of the particles to be recovered is prevented. Such a pulp-producing operation has been disclosed in the patent to Anderson No. 2,046,312, and certain features described but not claimed herein have been claimed in the aforesaid patent.

In the present invention, the pulp-forming step of the treatment differs from that disclosed in the Anderson patent by reason of the use of a catalyst capable of promoting a flotation reaction for sodium chloride, such as lead or bismuth for example, which is dissolved in the saturated solution of the pulp. This produces a liquid phase of a different character than that employed in the Anderson patent, as will be explained more fully hereinafter.

Another object of the present invention is to provide a catalytic solution in a flotation pulp containing sylvinite ore, which will result in certain reagents developing a selective affinity for certain of the ore constituents, which they do not possess in a similar pulp having no catalyst present.

Catalysts capable of entering into solution in the solution saturated with respect to both sodium chloride and potassium chloride, function therein to promote the separation of sodium salts from potassium salts. Lead, or bismuth, or their salts are examples of compositions particularly suited for this purpose.

The class of reagents referred to consist of oleic acid, salt water or brine-soluble soaps, such as palm kernel oil soap and coconut oil soap, which are derivatives of a fatty acid, and the resin soaps, or alkali resinates.

The present application is in part a continuation of my copending application, Serial No. 755,577, filed December 1, 1934 for Flotation process. Likewise, subjects matter described but not claimed in the present application have been described and claimed in my copending applications Serial No. 755,576 filed December 1, 1934, patented January 11, 1938, No. 2,105,294; Serial No. 11,059 filed March 14, 1935, patented January 11, 1938, No. 2,105,295; Serial No. 28,983 filed June 28, 1935 and Serial No. 81,729 filed May 25, 1936.

When reagents of the aforementioned class are used in the pulp of the present invention, they exert a selective affinity for sodium chloride solids, as well as the other solids, such as polyhalite and the gangues but exclusive of potassium chloride, with the result that all such constituents are collected in a froth, while the residual solids of the treatment, which are a purified potassium chloride product, may be removed separately.

In contradistinction, when the same reagents are used in a pulp of the type employed in the Anderson process, the reagents have no affinity for sodium chloride, as has been fully explained in my copending application Serial No. 150,341.

The reagents of the present treatment produce frothing, collection, promotion and selection in the flotation treatment of ores of the above-described character in the aforesaid pulp containing a catalyst, such as lead or bismuth in solution.

The ore is prepared for treatment in the usual way by grinding or otherwise reducing the same to a finely-divided condition. While each operation will involve some variation in treatment based upon variable characteristics of the ore and similar causes, grinding to —48 mesh may be taken as a standard for efficient operation.

The ground ore is entered into a saturated solution of the ore, that is, a solution saturated with respect to both sodium chloride and potassium chloride, and prior to the commencement of the flotation action the catalyst must be entered into or present in the said saturated solution.

It will be understood that any of the well-known methods of dry or wet grinding may be employed, and it has been found in practice that good results will be attained by wet grinding in a pebble mill in closed circuit with a classifier.

In such an operation, it is usually preferable to introduce the catalyst in the grinding circuit, although it may be entered otherwise where desired.

The pulp is then conducted to any suitable froth flotation apparatus and subjected to selective flotation by the use of the reagent, which may be any one of the aforementioned compositions, or mixtures thereof, which may be initially mixed with the pulp before being subjected to agitation and aeration, or if more convenient, they may be separately introduced into the flotation tank and mixed by the agitative action of the process.

The use of the reagents causes the selective flotation of the sodium chloride and gangue constituents in suspension separate from the potassium chloride which is discharged from the vessel as a substantially pure potassium chloride residue or concentrate, while the sodium chloride and gangue entrapped in the froth, is discharged from the vessel by overflowing the froth.

While I do not wish to be limited to any exact proportions in the use of the substances comprising the reagent, satisfactory results have been obtained by the use of from one-fourth to twenty pounds of reagent per ton of ore, and preferably the amount used should be approximately four pounds per ton of ore.

From a trace to ten pounds of dissolved lead or bismuth in the solution per ton of ore treated will provide an effective range for good flotation, and between one and two grams of lead per litre in the solution proves highly satisfactory. Unlike the flotation reagent, the catalyst is not removed or destroyed by the flotation reaction and therefore does not have to be added continuously.

To afford a better understanding of the operating procedure, certain test operations will be cited. In the first of these, sylvinite ore from the Carlsbad, New Mexico field was subjected to treatment. On analysis this was shown to contain 42.3% potassium chloride.

A pulp was prepared by introducing finely ground ore into a saturated solution of the same ore in which lead acetate had also been introduced. Oleic acid was selected as the flotation reagent, and when the pulp was subjected to the action of the reagent in the flotation machine, there was recovered the following separated products:

53% sodium chloride froth containing 7.1% potassium chloride,

47% potassium chloride residue containing 81.7% potassium chloride.

The rejection of potassium chloride thus may be calculated as being 91%.

In another test, the solution used in the flotation operation was made up by mixing 3000 cc. of saturated sylvinite solution and 33 cc. of an aqueous solution of lead acetate to bring the solution to approximately 2 grams of lead per litre. One sample was taken from this solution for analysis.

To a mechanically-agitating flotation machine, 1800 cc. of the above solution was added, together with 525 grams of 48 mesh sylvinite ore from the Carlsbad field. The resulting pulp was then agitated without air and with the addition of the following reagent in equivalent pounds per ton of sylvinite: 2 pounds soda coconut soap per ton of ore (½ gram soap dissolved in 10 cc. water).

After thorough mixing of the above pulp, the air was turned on and a first froth was then removed. During the flotation 500 cc. of the above described solution was added to maintain the pulp level. Upon completion of the above flotation, the air was shut off and the same amount of identical reagent was added to and mixed with the pulp.

After thorough mixing, the air was again introduced into the agitating pulp and the resulting froth removed. 500 cc. more of the aforesaid solution was added during flotation to maintain the pulp level. The two froths were then filtered, weighed wet, dried, weighed and analyzed separately. The unfloated residue remaining in the machine was likewise filtered, weighed wet, dried, weighed and analyzed.

The chemical analysis of the solution showed 1.94 grams of lead per litre both before and after flotation, illustrating that no consumption of lead occurs in the flotation reaction.

The combined data and results of the aforesaid test are shown in the following tabulation:

| Product Time and temperature[1] | Weights | | | | | Percent dry weight analysis | | | Percent corrected analysis | | |
|---|---|---|---|---|---|---|---|---|---|---|---|
| | Wet | Dry | Corrected | (2) | Percent corrected weight | KCl | NaCl | Insoluble | KCl | NaCl | Insoluble |
| Float started 2:42 p. m.; first froth sample No. 3127; 2:47, first froth removed | 206 | 186 | 177.2 | 186.5 | 37.2 | 11.2 | 87.7 | 2.87 | 9.96 | 88.9 | 3.02 |
| Second froth or middling, sample No. 3128; 2:52, second froth removed | 163 | 146 | 138.4 | 145.5 | 29.0 | 43.8 | 55.6 | 0.64 | 44.4 | 55.0 | .68 |
| Unfloated pulp or flotation residue, sample No. 3129 | 203 | 174 | 160.5 | 168.0 | 33.8 | 92.3 | 6.9 | 0.80 | 97.1 | 1.81 | .86 |
| Total | 572 | 506 | 475.0 | 500 | 100.0 | | | | | | |
| Head sample | | | | | | 48.9 | 49.5 | 1.62 | 49.7 | 48.7 | 1.7 |

[1] Temperature: Start 17° C.; finish 18° C.
[2] Weight corrected to equal 500 grams.

This test illustrates the selective action when a salt water soap, such as coconut soap is used as the flotation reagent in a solution containing lead in addition to the normal saturation of sodium chloride and potassium chloride. The analysis shows no consumption of lead during flotation. Solutions when once given the proper tenor in lead can be used over and over again without further addition of lead, and the solution is essentially a new solution in flotation, since in addition to being saturated with respect to the soluble constituents of the sylvinite ore, it also carries a complex lead-chlorine ion.

Further, the present solution may be distinguished from the ordinary solution saturated with respect to both sodium chloride and potassium chloride by the fact that the present solution increases the saturation point of NaCl and KCl; such solution containing more of both NaCl and KCl for a given temperature than the same solution without lead. This fact is shown in the following tabulation:

*Equilibria for the system KCl—NaCl—H₂O—Pb(NO₃)₂*

[Pb = constant = 1.8 grams per liter]

| KCl in brine | | Temperature, degrees Fahrenheit | | | | | | | | | | | |
|---|---|---|---|---|---|---|---|---|---|---|---|---|---|
| Gms. per liter | Per-cent | 40 | 50 | 60 | 70 | 80 | 90 | 100 | 110 | 120 | 130 | 140 | 150 |
| | | Percent sodium chloride in saturated brine | | | | | | | | | | | |
| 102 | 8.3 | 22.6 | 22.7 | 22.9 | 23.1 | 23.2 | 23.4 | 23.6 | 23.7 | 23.9 | 24.1 | 24.2 | 24.4 |
| 113 | 9.2 | 21.1 | 22.2 | 22.4 | 22.6 | 22.7 | 22.9 | 23.1 | 23.2 | 23.4 | 23.6 | 23.7 | 23.9 |
| 123 | 10.0 | 19.7 | 20.8 | 21.9 | 22.1 | 22.2 | 22.4 | 22.6 | 22.7 | 22.9 | 23.1 | 23.2 | 23.4 |
| 134 | 10.9 | 18.3 | 19.4 | 20.5 | 21.6 | 21.7 | 21.9 | 22.1 | 22.2 | 22.4 | 22.6 | 22.7 | 22.9 |
| 144 | 11.7 | 16.8 | 17.9 | 19.0 | 20.1 | 21.2 | 21.4 | 21.6 | 21.7 | 21.9 | 22.1 | 22.2 | 22.4 |
| 155 | 12.6 | 15.4 | 16.5 | 17.6 | 18.7 | 19.8 | 20.9 | 21.1 | 21.2 | 21.4 | 21.6 | 21.7 | 21.9 |
| 167 | 13.4 | 14.0 | 15.1 | 16.2 | 17.3 | 18.4 | 19.5 | 20.6 | 20.7 | 20.9 | 21.1 | 21.2 | 21.4 |
| 177 | 14.3 | 12.5 | 13.6 | 14.7 | 15.8 | 16.9 | 18.0 | 19.1 | 20.2 | 20.4 | 20.6 | 20.7 | 20.9 |
| 188 | 15.1 | 11.1 | 12.2 | 13.3 | 14.4 | 15.5 | 16.6 | 17.7 | 18.8 | 19.9 | 20.1 | 20.2 | 20.4 |
| 198 | 16.0 | 9.7 | 10.8 | 11.9 | 13.0 | 14.1 | 15.2 | 16.3 | 17.4 | 18.5 | 19.6 | 19.7 | 19.9 |
| 210 | 16.8 | 8.2 | 9.3 | 10.4 | 11.5 | 12.6 | 13.7 | 14.8 | 15.9 | 17.0 | 18.1 | 19.2 | 19.4 |
| 220 | 17.7 | 6.8 | 7.9 | 9.0 | 10.1 | 11.2 | 12.3 | 13.4 | 14.5 | 15.6 | 16.7 | 17.8 | 18.9 |

Percent NaCl = $\underbrace{32.1 - 1.68K + .11T}_{(A)} < \underbrace{23.9 - .033T}_{(B)} < \underbrace{26.9 - .6K + .017T}_{(C)}$ (A) Equation when deficiency exists in the NaCl solid phase.
(B) Equation when no deficiency exists in the solid phases.
(C) Equation when deficiency exists in the KCl solid phase.
K = Percent KCl in brine.
T = Temperature in degrees Fahrenheit.

From the foregoing it will be apparent that the liquid phase of the material of the present treatment has varying amounts of the respective salts present for each temperature variation, and variations in temperature of any considerable magnitude will result in an erratic flotation operation.

Further, when there is a decrease in the amount of catalyst in solution as occurs from mechanical losses following a considerable period of operation, erratic flotation also results.

Therefore, when the operation is continuous, it will be desirable to maintain the flotation temperature substantially uniform and the amount of catalyst in solution substantially constant to the end that no appreciable change in the efficiency of the flotation will be encountered.

For this reason it is preferable in commercial operations, to introduce the lead or bismuth directly into the grinding circuit and preferably in the pebble mill, where it will enter into solution and thoroughly condition the pulp of the mill discharge which serves as the feed to the flotation stage.

Salts of lead or bismuth are a convenient means of entering the metal into solution and lead salts, such as lead acetate, lead nitrate, lead sulfate, lead carbonate, lead chloride, or lead oxide may be employed for this purpose. Similarly, bismuth salts, such as bismuth sulfate, bismuth nitrate and bismuth chloride may be used.

Since metallic lead and bismuth and their salts are particularly adapted to act as a catalyst and a catalyst of the aforementioned type, in solution is an essential to the production of a proper pulp for the separative action of the process, the term "cation of the lead-bismuth class" will be used to designate any composition having the characteristics of dissolved lead in the halite-sylvite solution.

In this connection, it will be understood that metallic lead or bismuth will dissolve in the saturated sylvinite solution and the periodic addition of small amounts of either metal in the grinding mill will serve to keep the proper amount of cation in solution.

In addition to the advantage of being cheaper than its salts, metallic lead or bismuth goes into solution slowly as compared with the action of their salts and therefore do not subject the saturated solution to wide solubility variations, which tend to cause erratic flotation.

From the foregoing it will be apparent that the grinding circuit affords an excellent means of regulating the various factors which tend to cause erratic flotation and variations in separation and recovery.

After any given flotation separation, two products remain. In one of these, the froth concentrate, sodium chloride and gangue material are present as solids together with some of the saturated solution of the flotation treatment as a liquid phase.

In the other, the residual solids are a purified potassium chloride product suspended in the saturated solution of the original pulp. Treatment of each of these products for the separation of solids from liquid serves to provide a quantity of properly conditioned saturated solution, corresponding substantially with the amount required for forming the pulp of the original treatment.

Since considerable time is required to saturate a given quantity of water with the sodium chloride and potassium chloride, it is highly desirable in a continuous operation to recirculate the separated solution of these subsequent treatments to the grinding and flotation stage of the operation to serve as the liquid phase of such operations.

As previously explained, the lead or bismuth content of the solution is not dissipated in the flotation action, and only occasional additions to the solution in such a cyclic operation are required to maintain this content substantially uniform.

A control of temperature may also be utilized in connection with the grinding and flotation operations by cooling the circulating solution prior to its introduction into such operations, the quantity and temperature of the solution so introduced being predetermined to compensate for the temperature rise occasioned by the mechanical heating resulting from such operations.

Thus, when the present process is used as a continuous operation, the recirculation of solution eliminates the necessity for continuous production of new solution, and especially eliminates the need for continuous introduction of lead into the solution.

The solubility control and temperature regulations permits the operation to continue over long periods under optimum conditions, and high recoveries and a good grade of concentrate are obtained.

Since numerous reagents are shown to be effective in producing the flotation reaction of the present process, the term "a reagent of the group consisting of oleic acid, salt water soaps and alkali resinates" will be used in the specification to designate the reagents as a class.

While the various steps and treatments hereinbefore described disclose what is practice has given highly efficient results in the separation of the valuable constituents of sylvinite ores, it will be apparent that changes in the operating procedure and in the various steps and treatments may be availed of without departing from the spirit of the invention as herein set forth, and it will be understood that the various phases of the operating procedure are cited merely for the purpose of illustrating the invention and not for the purpose of defining the limits thereof, reference being had to the appended claims for this purpose.

What I claim and desire to secure by Letters Patent is:

1. A process for the recovery of a purified potassium chloride product from sylvinite ores, which comprises the introduction of such ores in finely-divided condition into a solution saturated with respect to both sodium chloride and potassium chloride, to form a pulp, introducing into the solution containing the pulp a salt of a metal of the group consisting of lead and bismuth capable of promoting a flotation reaction for sodium chloride, and subjecting such pulp to a froth flotation treatment in the presence of a salt water soap.

2. A process for the recovery of a purified potassium chloride product from sylvinite ores, which comprises the introduction of such ores in finely-divided condition into a solution saturated with respect to both sodium chloride and potassium chloride to form a pulp, introducing into the solution containing the pulp a salt of a metal of the group consisting of lead and bismuth capable of promoting a flotation reaction for sodium chloride, and subjecting such pulp to a froth flotation treatment in the presence of coconut oil soap.

3. In a process of treating sylvinite ores, the steps of wet grinding sylvinite ore in a solution saturated with respect to both sodium chloride and potassium chloride, dissolving a catalyst of the lead-bismuth class in said solution in the grinding stage, and subjecting the discharge of the grinding step to a froth flotation treatment in the presence of a reagent comprising a brine-soluble fatty acid or fatty acid soap having ten or more carbon atoms and a selective affinity for sodium chloride.

4. In a process of treating sylvinite ores, the steps of wet grinding sylvinite ore in a solution saturated with respect to both sodium chloride and potassium chloride, dissolving lead in said solution in the grinding stage, and subjecting the discharge of the grinding step to a froth flotation treatment in the presence of a reagent comprising a brine-soluble fatty acid or fatty acid soap having ten or more carbon atoms and a selective affinity for sodium chloride.

5. In a process of treating sylvinite ores, the steps of wet grinding sylvinite ore in a solution saturated with respect to both sodium chloride and potassium chloride, dissolving bismuth in said solution in the grinding stage, and subjecting the discharge of the grinding step to a froth flotation treatment in the presence of a reagent comprising a brine-soluble fatty acid or fatty acid soap having ten or more carbon atoms and a selective affinity for sodium chloride.

6. In a process of treating sylvinite ores, the steps of wet grinding sylvinite ore in a solution saturated with respect to both sodium chloride and potassium chloride and containing a catalyst of the lead-bismuth class, and subjecting the discharge of the grinding step to a froth flotation treatment in the presence of a reagent comprising a brine-soluble fatty acid or fatty acid soap having ten or more carbon atoms and a selective affinity for sodium chloride.

7. In a process of treating sylvinite ores, the steps of wet grinding sylvinite ore in a solution saturated with respect to both sodium chloride and potassium chloride and containing a catalyst of the lead-bismuth class in solution, and subjecting the discharge of the grinding step to a froth flotation treatment in the presence of a reagent containing a fatty acid radical having a selective affinity for sodium chloride in the presence of said catalyst.

8. A process for the recovery of a purified potassium chloride product from sylvinite ores, which comprises the introduction of such ores in finely-divided condition into a solution saturated with respect to both sodium chloride and potassium chloride, to form a pulp, introducing into said pulp a catalyst of the lead-bismuth class, and subjecting such pulp to a froth flotation treatment in the presence of a reagent soap soluble in a saturated sylvinite solution and having in the presence of said catalyst, a selective affinity for sodium chloride in the pulp, whereby potassium chloride is recovered as a residue of the flotation reaction, separate from the froth concentrate.

9. A process for the recovery of a purified potassium chloride product from sylvinite ores, which comprises the introduction of such ores in finely-divided condition into a solution saturated with respect to both sodium chloride and potassium chloride, to form a pulp, introducing into said pulp a catalyst of the lead-bismuth class, and subjecting such pulp to a froth flotation treatment in the presence of oleic acid, whereby potassium chloride is recovered as a residue of the flotation reaction, separate from the froth concentrate.

10. A process for the recovery of a purified potassium chloride product from sylvinite ores, which comprises the introduction of such ores in finely-divided condition into a solution saturated with respect to both sodium chloride and potassium chloride, to form a pulp, introducing into said pulp a catalyst of the lead-bismuth class, and subjecting such pulp to a froth flotation treatment in the presence of palm kernel oil soap, whereby potassium chloride is recovered as a residue of the flotation reaction, separate from the froth concentrate.

11. A process for the recovery of a purified potassium chloride product from sylvinite ores, which comprises the introduction of such ores in finely-divided condition into a solution saturated with respect to both sodium chloride and potassium chloride, to form a pulp, introducing into said pulp a catalyst of the lead-bismuth class, and subjecting such pulp to a froth flotation treatment in the presence of coconut oil soap, whereby potassium chloride is recovered as a residue of the flotation reaction, separate from the froth concentrate.

12. A process for the recovery of a purifier potassium chloride product from sylvinite ores, which comprises the introduction of such ores in finely-divided condition into a solution saturated with respect to both sodium chloride and potassium chloride, to form a pulp, introducing into said pulp a catalyst of the lead-bismuth class, and subjecting such pulp to a froth flotation treatment in the presence of a salt water soap, whereby potassium chloride is recovered as a residue of the flotation reaction, separate from the froth concentrate.

13. A process for the recovery of a purified potassium chloride product from sylvinite ores, which comprises the introduction of such ores in finely-divided condition into a solution saturated with respect to both sodium chloride and potassium chloride, to form a pulp, introducing into said pulp a catalyst of the lead-bismuth class, and subjecting such pulp to a froth flotation treatment in the presence of a mixture of reagents consisting of oleic acid, salt water soaps and alkali resinates, whereby potassium chloride is recovered as a residue of the flotation reaction, separate from the froth concentrate.

ARTHUR J. WEINIG.